(12) United States Patent
Mardinian et al.

(10) Patent No.: US 6,711,245 B1
(45) Date of Patent: Mar. 23, 2004

(54) METHOD AND APPARATUS FOR PROCESSING CALL PROGRESS OF A SERIAL COMMUNICATION DEVICE

(75) Inventors: Olivier Mardinian, Sunnyvale, CA (US); Jonathan How-Lian Ta, Irvine, CA (US); Jeffrey Wei Huang, Rowland Heights, CA (US)

(73) Assignee: Apple Computer, Inc., Cupertino, CA (US)

( * ) Notice: Subject to any disclaimer, the term of this patent is extended or adjusted under 35 U.S.C. 154(b) by 110 days.

(21) Appl. No.: 10/099,582

(22) Filed: Mar. 15, 2002

(51) Int. Cl.[7] ............................................. H04M 11/00
(52) U.S. Cl. ................................ 379/93.28; 379/110.01; 379/372
(58) Field of Search ........................ 379/93.26, 93.28, 379/93.31, 93.34, 110.01, 350, 377, 381, 382, 386, 372

(56) References Cited

U.S. PATENT DOCUMENTS 6,173,054 B1 * 1/2001 Beyda et al. ............ 379/93.29

\* cited by examiner

*Primary Examiner*—Wing Fu Chan
(74) *Attorney, Agent, or Firm*—Blakely, Sokoloff, Taylor & Zafman LLP

(57) ABSTRACT

The present invention includes a method and system to provide the capability of a serial based analog modem to play its connection call progress in a digital format, thus eliminating the need for analog to digital conversion at the host. In one aspect of the invention, an exemplary method includes receiving data at the serial communication device, from a serial communication network; identifying the data as call progress audio samples; transmitting the call progress audio samples to the host through the serial interface, the serial interface carrying serial data or call progress audio samples; and playing the call progress audio samples at the audio system of the host. Other methods and apparatuses are also described.

76 Claims, 14 Drawing Sheets

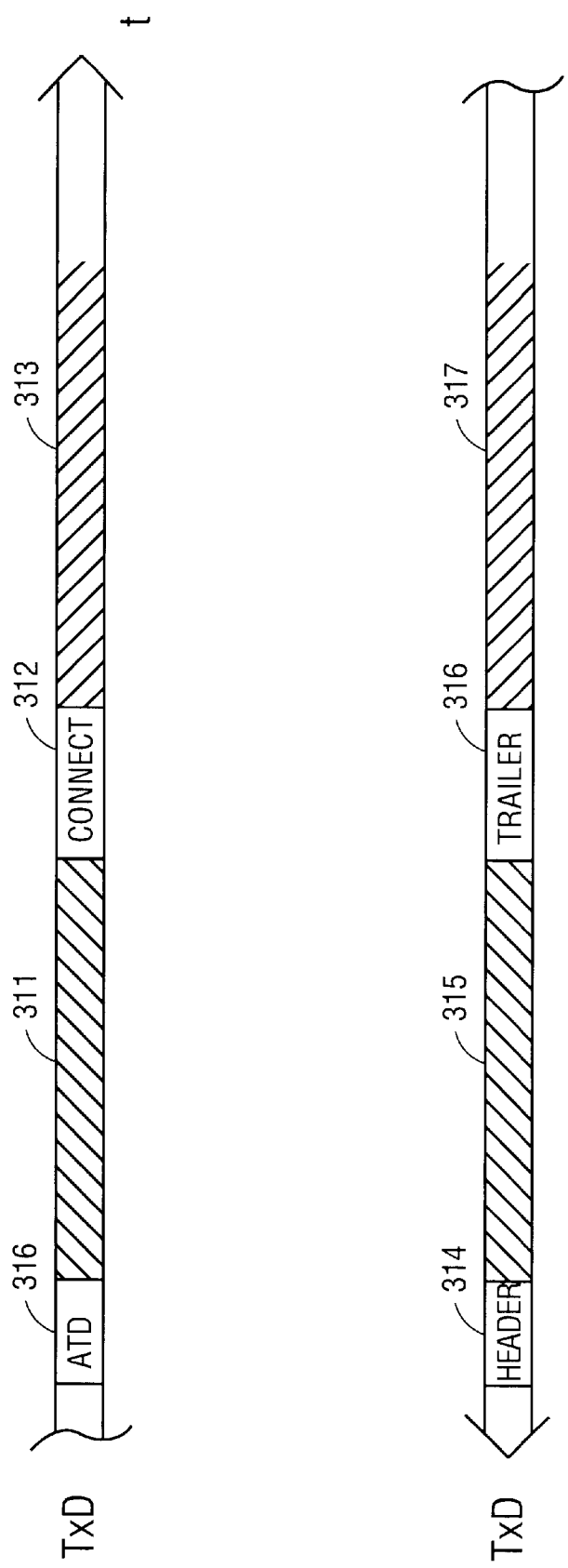

METHOD AND APPARATUS FOR PROCESSING CALL PROGRESS OF A SERIAL COMMUNICATION DEVICE

FIELD OF THE INVENTION

The invention relates to data communications, and more specifically to method and apparatus for processing call progress of a serial communication device.

BACKGROUND OF THE INVENTION

Modern modems are used to connect PCs, or other data terminal equipment (DTE), into wide area communication networks, in which the telephone system is used to carry information from one PC to another. Over the years many communication standards have been developed, enabling a standards-compliant modem made by one manufacturer to communicate with a standards-compliant modem made by another manufacturer. These protocols specify various aspects of a communication protocol, such as signal constellations and coding methods to be used under the standard.

To date, modems have been typically implemented with an on-board speaker to play call progress data during a call progress period. Alternatively a modem typically includes a special cable connecting with an audio system of a host, such that the call progress signal may be transmitted from the modem to the host and be played at the audio system of the host, through the special cable. FIG. 1A shows a conventional modem having an onboard speaker to play the call progress signal. The system 100 typically includes a host 101 coupled with a modem device 102 through a serial interface 103. The modem device 102 typically includes an onboard speaker 109. Thus, during a call progress period, call progress signal received from the outside phone line 107, is extracted from the data access arrangement (DAA) 106. The DAA 106 then transmits the call progress signal to the onboard speaker 109 through an amplifier 108.

Alternatively, as described in FIG. 1B, a modem may utilize an audio system of the host 101 to play call progress. Referring FIG. 1B, the call progress signal received from the phone line 107 is extracted from the DAA 106. The DAA 106 then transmits the call progress signal to an audio output circuit 110. The audio output circuit 110 then transmits the call progress signal through an audio cable 115 to an audio input circuit 111 of the host 101. A typical mixer circuit 112 then mixes the call progress signal with other audio inputs (e.g., music data played from an application of the host) and inputs the call progress signal to the audio system 113. The call progress signal is then played at the speaker 114 of the host.

As described above, a conventional modem requires either a speaker built-in on the modem to play call progress, or a special circuitry such as, audio output circuit 110, audio input circuit 111, to utilize the audio system of the host. In a competitive market, sometimes the costs of these components or circuits are not acceptable. Hence, it is desirable to have an improved method or system such that a modem may utilize the audio system of the host without extra costs.

SUMMARY OF THE INVENTION

Accordingly, the present invention introduces a method and system to provide the capability of a serial based analog modem to play its connection call progress in a digital format, thus eliminating the need for analog to digital conversion at the host and the extra circuitry. In one aspect of the invention, an exemplary method includes receiving data at the serial communication device, from a serial communication network; identifying the data as call progress audio samples; transmitting the call progress audio samples to the host through the serial interface, the serial interface carrying serial data or call progress audio samples; and playing the call progress audio samples at the audio system of the host.

In an alternative embodiment, the exemplary method further includes receiving the data at the host, the data being transmitted from the serial communication device through the serial interface; examining the data at the host, to determine whether the data are call progress audio samples; transmitting the audio samples to the audio system and playing the audio samples at the audio system, if the data are call progress audio samples; and processing the data as regular serial data at the host, if the data are not call progress audio samples.

In yet another alternative embodiment, an exemplary method includes receiving data at the serial communication device, from a serial communication network, identifying the data as call progress audio samples; transmitting a first character sequence to the host through the serial interface, the first character sequence identifying starting of the call progress; transmitting the call progress audio samples to the host through the serial interface, the serial interface carrying serial data or call progress audio samples; and transmitting a second character sequence to the host through the serial interface, the second character sequence indicating ending of the call progress.

In yet another alternative embodiment, an exemplary method includes receiving the data at the host, the data being transmitted from the serial communication device through the serial interface, the serial interface carrying serial data or call progress audio samples; examining the data at the host, to determine whether the data are call progress audio samples; transmitting the audio samples to the audio system and playing the audio samples at the audio system, if the data are call progress audio samples; and processing the data as regular serial data at the host, if the data are not call progress audio samples.

The present invention includes apparatuses which perform these methods and machine-readable media which, when executed on a data processing system, cause the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A, 3B, and 3C show data processing at a time line basis, according to one embodiment of the invention.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Figure 1A:
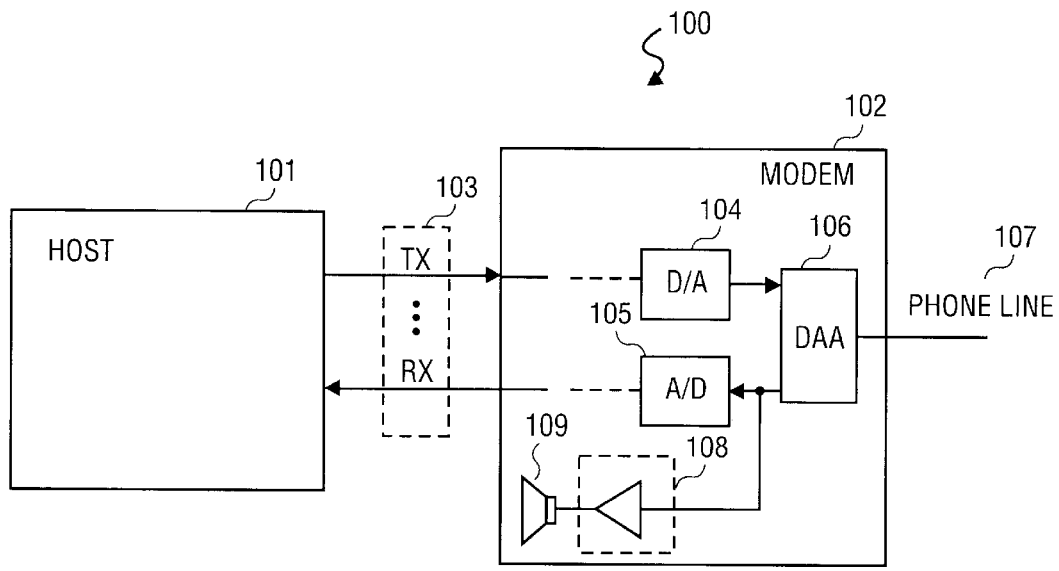
FIG. 1A shows a conventional serial communication device.
Figure 1B:
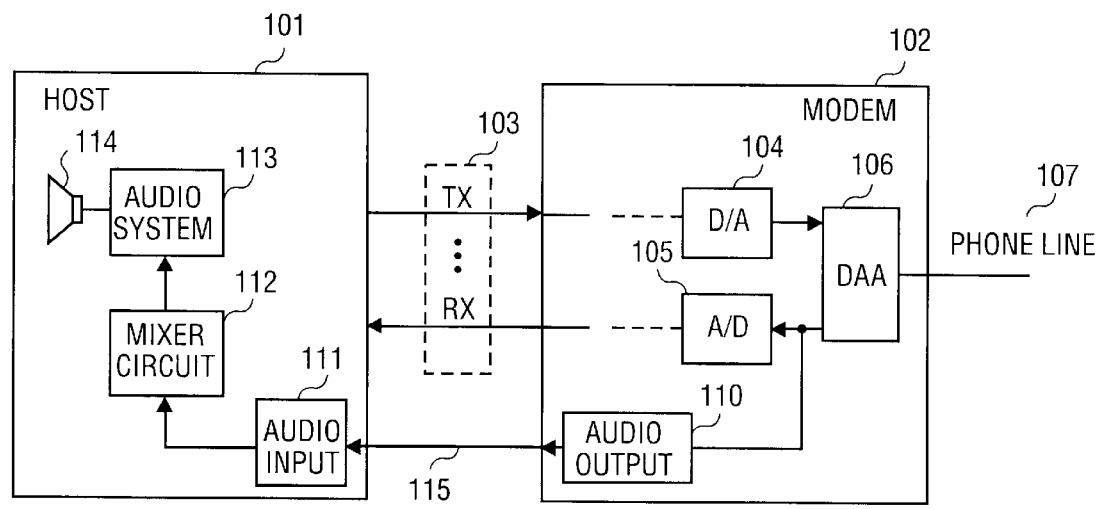
FIG. 1B shows another conventional serial communication device.
Figure 2:
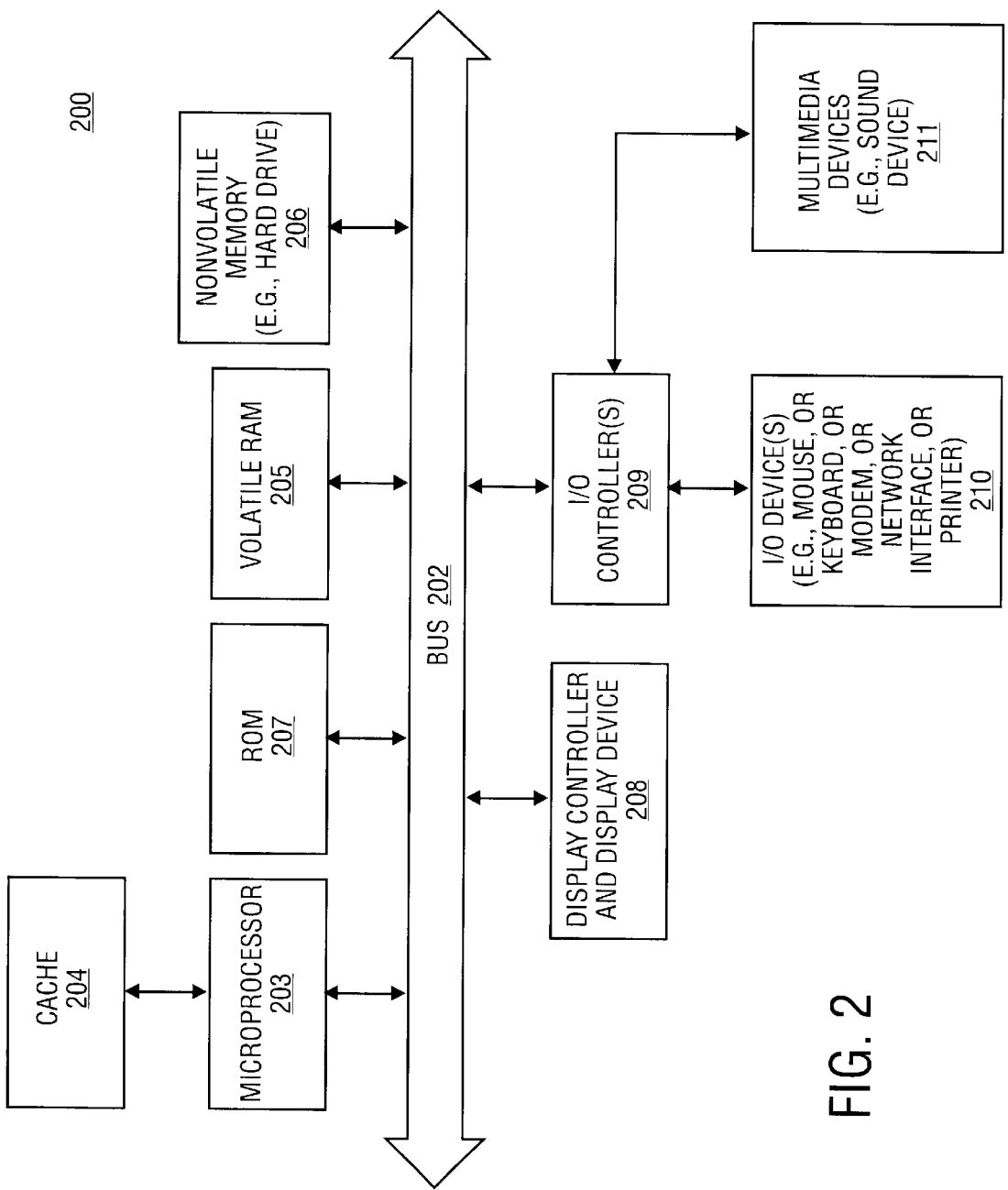
FIG. 2 shows an exemplary computer system which may be used with an embodiment of the present invention.

FIG. 2 shows an example of a typical computer system which may be used with the present invention. Note that while FIG. 2 illustrates various components of a computer system, it is not intended to represent any particular architecture or manner of interconnecting the components, as such details are not germane to the present invention. It will also be appreciated that network computers and other data processing systems which have fewer components or perhaps more components may also be used with the present invention. The computer system of FIG. 2 may, for example, be an Apple Macintosh computer. As shown in FIG. 2, the computer system 200, which is a form of a data processing system, includes a bus 202 which is coupled to a microprocessor 203 and a ROM 207, a volatile RAM 205, and a non-volatile memory 206. The microprocessor 203, which may be a PowerPC G3 or PowerPC G4 microprocessor from Motorola, Inc. or IBM, is coupled to cache memory 204 as shown in the example of FIG. 2. The bus 202 interconnects these various components together and also interconnects these components 203, 207, 205, and 206 to a display controller and display device 208, as well as to multimedia device 211 including an audio device and to peripheral devices such as input/output (I/O) devices, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Figure 3A:
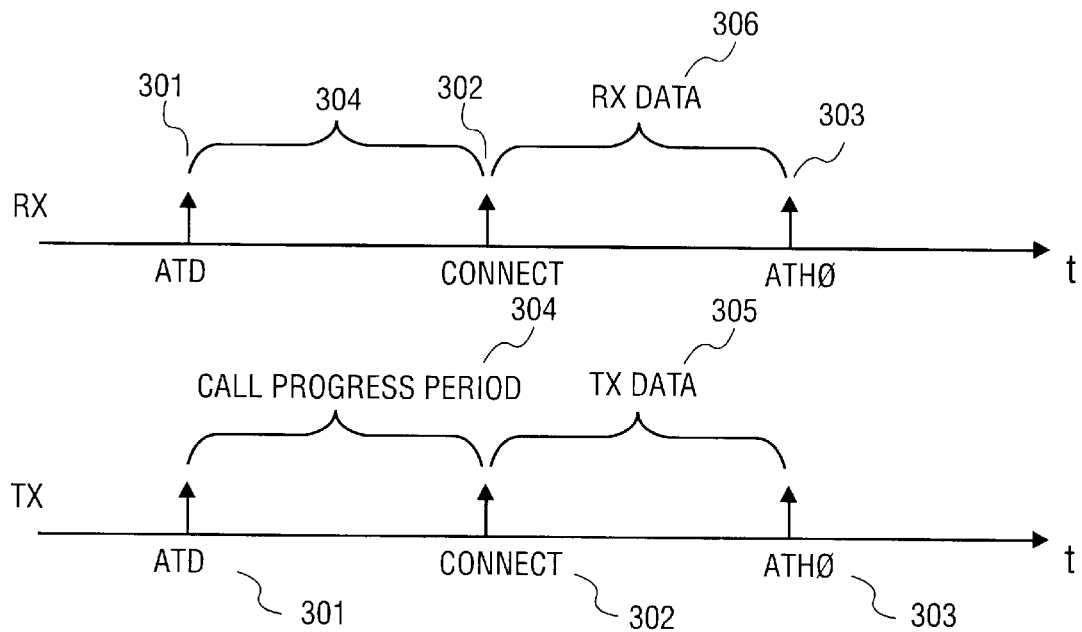

The concept of an embodiment of the invention is based on the fact that during the modem connection handshake, there is no traffic of characters on the serial interface. Therefore, the connection digital call progress samples may be transmitted over the serial interface and play them at a next higher assembly (e.g., the host) audio system. As soon as the modem connection is established, the modem returns to the normal mode and exchanges regular transmitting and receiving characters with the remote end. FIG. 3A shows a typical modem connection handshake processing at a timeline basis. Referring to FIG. 3A, when a modem initiates a connection, a dial AT command (e.g., ATD command) is issued at the time 301. The dial command is transmitted with the destination phone number to a remote end. The remote end answers the command and returns a sequence of handshake messages. After a series of handshaking and negotiations, a connection is established at the time of 302. The time period between dialing 301 and the time a connection is established is called call progress period. During the call progress period, however, there is no data traffic along the receiving line (e.g., RX line) at the host side. At the mean while, the modem receives a sequence of call progress audio samples from the phone line. A conventional modem would transmit the call progress audio samples to a speaker built on the board of the modem, or a speaker of the host through an audio cable coupled to an audio system of the host, while the serial receiving line between the modem and the host is idle (e.g., there is no data traffic along the RX line).

Figure 3B:
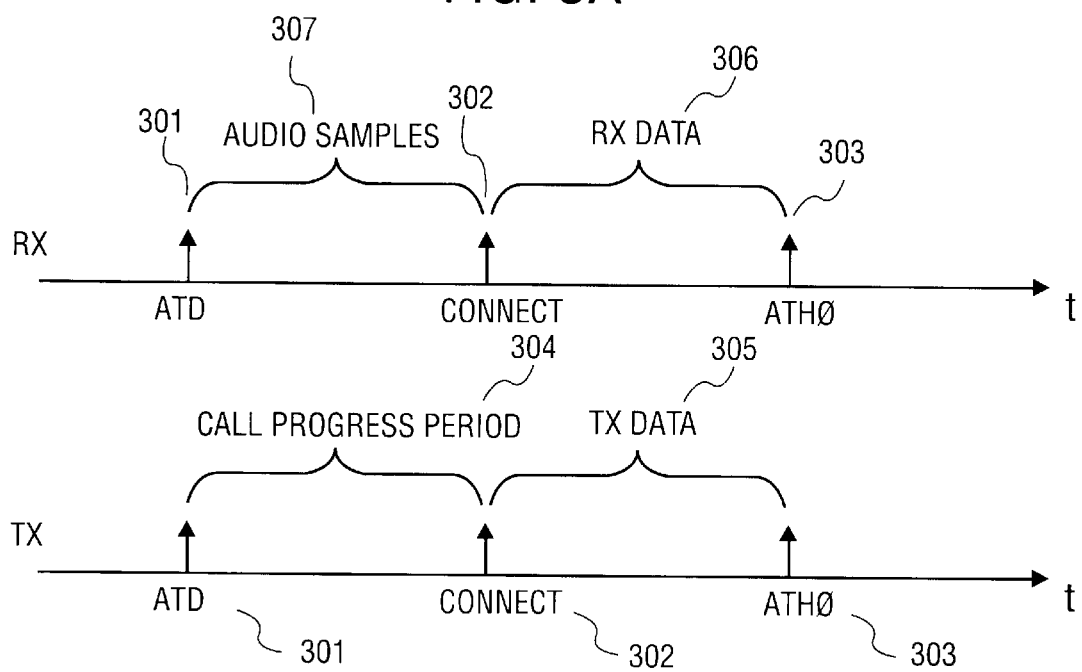

The present invention takes advantage of the time period of call progress. Since there are no serial data traffics on the serial lines during the call progress period, the call progress audio samples may be transmitted to the host through the serial interface (e.g., serial RX line). As soon as the connection is established, the modem can resume a normal process of the normal serial data over the serial interface. FIG. 3B shows an exemplary embodiment of a connection handshaking processing according to one aspect of the invention. When a user initiates a connection with the modem to a remote end, a dialing command such as ATD is issued at the time 301. The ATD command is transferred to the remote end. The remote end answers the call upon receiving the command. Thereafter, a series of handshaking and negotiation takes place. Then the connection is established at time 302. During the call progress period, there is no serial data traffic on the receiving line of the host. However, during the call progress period, the modem will receive call progress audio samples from the remote end. A conventional modem will transfer these audio samples to either an onboard speaker or an audio system of the host through an audio cable. An embodiment of the present invention takes an advantage of the fact that there is no serial data traffic on the receiving line on the host side. The call progress audio samples 307 are then transferred to the host through the serial interface, such as RS232 interface or PCI interface. Once the connection is established at time 302, the modem resumes normal transaction by sending normal serial data to the host through the serial interface, until the line is dropped (e.g., hang up) at the time of 303.

To ensure the quality of call progress audio playback through use of serial RS232 interface, the minimum throughput data rate is recommended to set at 115.2 kbits/second and over in order to meet the Nyquist criteria, which required at least 80 kbits/second assuming the audio samples is consist of 8 bit data plus one start bit and one stop bit. The next lower available throughput data rate setting on RS232 is 57.6 Kbits/second and this bandwidth is not sufficient enough to guarantee a good call progress audio playback. Above constraint does not applied to PCI interface and USB interface because they are running at much higher speed.

In order to ensure that audio samples are not confused with regular modem characters, a special header sequence and special trailer sequence are defined such that it is possible to find the beginning and the end of the audio portion of the data. In one embodiment, the header sequence is defined as the reception of the character sequence of <7E><02>. The trailer sequence is defined as the reception of the character sequence of <7E><03>. An escape mechanism is also defined in order to prevent real transmission characters or real audio samples to be intercepted as a header or a trailer sequence. Two different escape mechanisms are defined. The first escape mechanism is defined by doubling the <7E> characters in case a <7E> is a normal modem transmission character. As a result, the host knows that the <7E> character received was not to alert of the beginning of a header or trailer sequence. Secondly, the escape mechanism can be simplified by just decrementing the character <7E> to <7D> if character <7E> is being transmitted as a normal character. This simplified escape mechanism makes perfect sense because human ear is not capable to distinguish 1-bit difference between audio samples. In addition, the second mechanism also eliminates the doubling of characters, which in term can cause under sampling issue if many character <7E>s are showing up as normal audio samples. This is especially important when using RS232 serial interface as transmission medium, which requires supporting minimum baud rate of 115.2 kbits/second. Alternatively, in order to avoid having to parse data continuously, the data carrier detect (DCD) pin may also be monitored such that when it is active (e.g., carrier is up), there is no need to look for a header sequence as no audio samples are expected.

On the other hand, the modem needs to monitor all AT commands being received and process ATH1, ATD, and ATA commands separately. When these three commands are received, they will trigger the turn ON of the modem retrieving audio samples from an analog to digital (A/D) converter and start sending the audio samples on the serial interface to the host. Before it starts sending the audio samples, it will send characters <7E><02> as a header to alert the host that audio samples are coming. For ATH1 command, audio samples will be sent from the modem to the host all the time until the modem receives an ATH0 command. In which case, the modem will send the trailer sequence <7E><03> to alert the host that subsequent characters will not be audio samples anymore. For ATD command, audio samples are sent from the modem to the host until the connection is established. In which case, the modem will assert DCD and send the trailer sequence <7E><03> to alert the host that subsequent samples are not be audio samples.

FIG. 3C shows an exemplary data packet during a call progress period. The process starts with a dialing command 310, such as ATD command, is issued from the host through the transmitting line TxD. During the period 311, the modem performs handshaking and negotiation with a remote end until a connection is established at 312. Thereafter, normal serial data 313 are transferred from the modem to the remote end. At the mean while, on the receiving line RxD, an audio sequence 314 is transmitted from the modem to the host through the serial interface, once the dialing command 310 issued from the host, is received at the modem. The header 314 indicates a call progress period has started. Thereafter, the modem sends the call progress audio samples 315 through the serial interface to the host, until the connection is established at 312. At which point, the modem sends a trailer sequence 316 to the host indicating the call progress period has ended and the modem enters data mode. Subsequent data 317 are transmitted as regular serial data to the host through the serial interface. In one embodiment, the header sequence includes <7E><02> and the trailer sequence includes <7E><03>.

Figure 4:
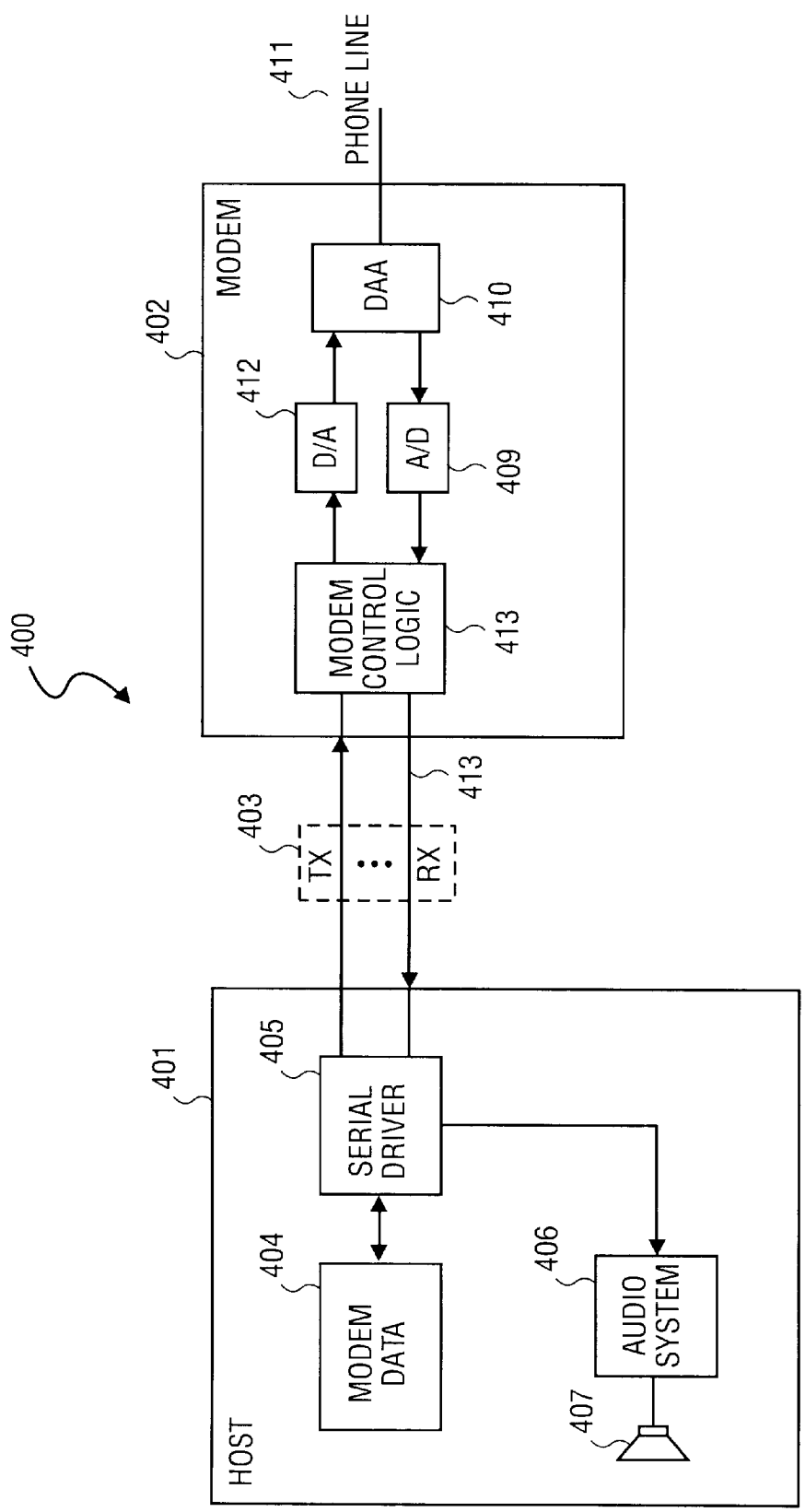
FIG. 4 shows a block diagram of an exemplary system according to one embodiment of the invention.

FIG. 4 shows an exemplary block diagram of a system according to an embodiment of the invention. The system 400 includes a host 401 and a modem 402. The modem 402 is coupled to the host through a serial interface 403. In one embodiment, the serial interface 403 may be a RS232 cable coupled to the modem, particularly when the modem is an external modem. In alternative embodiment, the serial interface may be a peripheral component interface (PCI) bus or a universal serial bus (USB). Other interfaces may be utilized. The modem 402 includes a modem control logic 408 and other typical modem components, such as analog to digital (A/D) converter 409 and data access arrangement (DAA) 410. The host may be a personal computer, such as computer system 200 of FIG. 2. When a user dials up to a remote end, the user instructs the host to send out a dialing sequence including a dialing command, such as ATD with a destination phone number. The dialing command is typically packaged as part of the modem data 404 from a terminal application, such as Hyperterm which may be distributed with the operating system executed at the host. The dialing commands are transferred to a serial driver 405. The serial driver 405 is normally located in the kernel space of an operating system. The serial driver 405 then transfers the dialing commands to the serial interface 403. When the modem is an external modem, the serial interface may be a serial port coupled with a RS 232 cable. Alternatively, the modem may be an internal modem coupled to the host through a bus, such as PCI or USB bus. The serial interface between the host and the modem may be one of such buses. The dialing sequence is transferred to the modem control logic 408 of the modem. The modem control logic may be implemented through software or hardware, or a combination of software and hardware. The commands are then translated from a digital command to an analog signal through the modem signal processing, followed by a conversion of the digital samples by the digital to analog (D/A) converter 412. The analog dialing sequence is then transferred to DAA 410 and out to the telephone central office through a phone line 411. Once the remote end receives the ring, the remote end answers and establishes the modem communication. Subsequent handshaking and negotiations are performed between the local end and remote end.

During this period (e.g., call progress period), there is no real serial data traffic on the receiving line 413 of the serial interface coupled between the host and the modem. However, during the call progress period, the modem normally receives call progress audio samples from the remote end through the phone line 411. The audio samples are processed through the DAA 410 and is digitized through an A/D converter. When the modem control logic 408 receives the digitized audio samples, the modem control logic 408 identifies these samples are call progress audio samples. In one embodiment, the modem control logic 408 detects the call progress period when a dialing or off-hook command, such as ATD or ATA, is issued from the host. The modem control logic 408 transmits the digital call progress audio samples to the host through the serial interface 403 (e.g., the RX line of the serial interface 403). When the serial driver 405 receives the call progress audio samples from the serial interface, the serial driver 405 dispatches the audio samples to the audio system 406 and the audio samples are played at the speaker 407 by the audio system of the host. Once the modem connection is established, the modem control logic transfers the modem serial data to the host through the serial interface 403 with an indication that these serial data are regular modem data, instead of audio samples. When the serial driver 405 receives the serial data, the serial driver 405 examines the data sequence to determine whether the data are regular modem data or audio samples. Once the serial driver 405 determines the data are regular modem data, the data are transferred as modem data 404, to a terminal application executed by the operating system.

Figure 5:
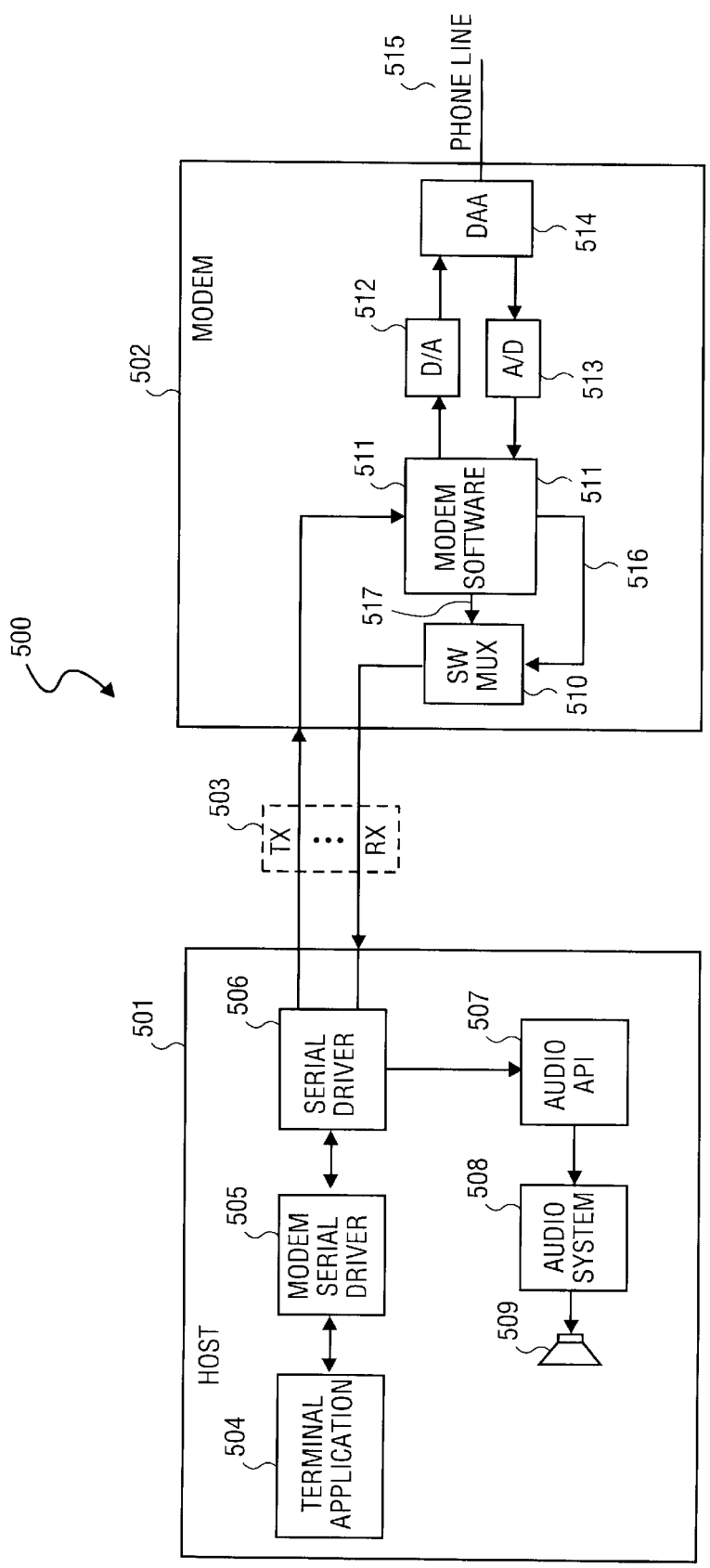
FIG. 5 shows a block diagram of an alternative exemplary system according to one embodiment of the invention.

FIG. 5 shows another exemplary block diagram of a system according to one embodiment of the present invention. The system 500 includes a host 501, a modem 502, and a serial interface 503, the serial interface 503 coupling the modem 502 to the host 501. The host 501 includes a terminal application 504, which may be an application provided through the operating system executed by a processor (not shown) of the host 501. The terminal application is typically running at a user level of the operating system. The host also includes a modem serial driver 505 which may be executed at a kernel level of the operating system. The modem driver normally performs low-level operation (e.g., communication with other drivers or hardware). The host further includes a software de-multiplex module 506. The software de-multiplex module 506 de-multiplexes the data received from serial interface 507 and determines whether the data are part of the call progress audio samples. If the de-multiplex module 506 determines that the data are call progress audio samples, it transmits the data to an audio system 508 through an audio application programming interface (API) 507. The audio samples are then played through the host speaker 509 by the audio system 508. The audio API may be an application interface that allows digital audio samples to be transferred directly to the audio system 508. In one embodiment, the audio API may be a DirectSound interface of DirectX architecture from Microsoft.

The modem 502 includes a data access arrangement (DAA) 514. The DAA 514 transmits and receives analog signals to and from a remote end through the serial communication network, such as phone line 515. In an alternative embodiment, the DAA 514 may communicate with a remote end through a wireless serial communication network. Other serial communication network may be utilized. When the modem initiates a connection with a remote end, the modem receives a dialing command, such as ATD with a remote end phone number, from a transmitting data line (TxD) through the serial interface 503. The dialing command is processed at the modem software 511 and converted into an analog signal through a digital to analog (D/A) converter 512. The command is then transmitted by the DAA 514 to the remote end through the phone line 515. When the modem software module 511 receives a dialing command, the modem software module indicates a call progress period has started. The modem software module 511 may send a signal back to the host through the serial interface 503, to notify the host that a call progress period has started. In one embodiment, the signal may include a character sequence, such as <7E><02>.

When the remote answers the call from the modem 502, a series of handshaking and negotiation takes place. As a result, the modem 502 receives corresponding call progress audio samples from the phone line 515. After the call progress audio samples are processed at the DAA 514 and digitized through an A/D converter 513, the modem software module 511 dispatches 516 the call progress audio samples to a software multiplex module 510 and thereafter the call progress audio samples are transmitted to the host through the serial interface 503. The serial interface may include a RS232 compatible interface. Alternatively, the serial interface may include a peripheral component interface (PCI) bus, through a set of memory or IO mapped registers. Furthermore, the serial interface may include a universal serial bus (USB) compatible interface. Other types of interfaces may be utilized.

When the software de-multiplex module 506 receives the call progress audio samples from the modem 502 through the serial interface 503, the de-multiplex module 506 determines whether these data are call progress audio samples. In one embodiment, the de-multiplex module 506 determines whether it received an indication, indicating a call progress period, previously transmitted from the modem. Typically, the modem may transmit an indication indicating a call progress period, before transmitting the call progress audio samples, to the host through the serial interface. In an alternative embodiment, since the host starts the initiation of a connection, the host may mark a call progress when it initiates a connection with commands, such as ATD, ATA, and ATH1 commands. The software de-multiplex module may start to process any data transmitted from the modem after one of the above-commands has been issued from the host. The data may be processed as call progress audio samples, until a connection has been established, or a hang-up command (e.g., ATH0) is received from the remote end.

When the software de-multiplex module 506 determines the data are call progress audio samples, it dispatches the audio samples to an audio system 508 of the host. The software de-multiplex module may dispatches the audio samples through an audio application programming interface (API). The audio API may be provided by the operating system executing at host. In one embodiment, the audio API may be a DirectSound API of the DirectX application from Microsoft. The audio system 508 may include a mixer circuit or software that mixes the call progress audio samples with other audio samples (e.g., music samples) and plays the call progress audio samples at the speaker 509.

If the data are determined as normal serial data, the software de-multiplex module 506 dispatches the data to a serial driver 505. The serial driver 505 then processes the data as regular serial modem data. The serial modem data are then transmitted to a terminal application 504 and may be displayed at a display device through a user interface. In one embodiment, the serial driver 505 may be a standard serial driver provided by the operating system. In an alternative embodiment, the serial driver 505 and the software de-multiplex module 506 may be a single piece of software stored at a computer readable media, such as hard disks. They may be loaded into a memory location, such as random access memory (RAM) and executed by the operating system during an initialization of the system. Alternatively, they may be dynamically loaded during an initialization of the modem. Typically, when a user launch a terminal application, the terminal application will instruct the operating system to launch a serial driver corresponding to a serial communication device.

In yet another alternative embodiment, when the software de-multiplex module 506 receives data from the modem 502, it may determine whether such data are regular serial modem data, through checking whether the data carrier detect (DCD) signal is received. When the modem 502 receives regular serial modem data from a remote end, the DCD pin is asserted. This signal is transmitted through the serial interface 503. DCD signal may be part of the serial interface 503 (e.g., DCD line of RS232 serial interface). Alternatively, the DCD signal may be detected through a set of mapped registers from a bus, such as a PCI bus or a USB bus. Furthermore, the DCD signal may be transferred as part of the status query from a universal asynchronous receiver transmitter (UART) compatible device. Thus, when the software de-multiplex module 506 receives data from the modem through the serial interface 503, it may check whether the DCD is asserted. If the DCD is asserted, the data received are the normal serial data. The software de-multiplex module 506 then may transmit the data to the serial driver 505 and thereafter, the data are transferred to a terminal application 504. Otherwise, if the DCD is not asserted, the software de-multiplex module 506 transfers the data as call progress audio samples to the audio system 508 through the audio API 507 and plays the audio samples at the speaker 509.

Figure 6:
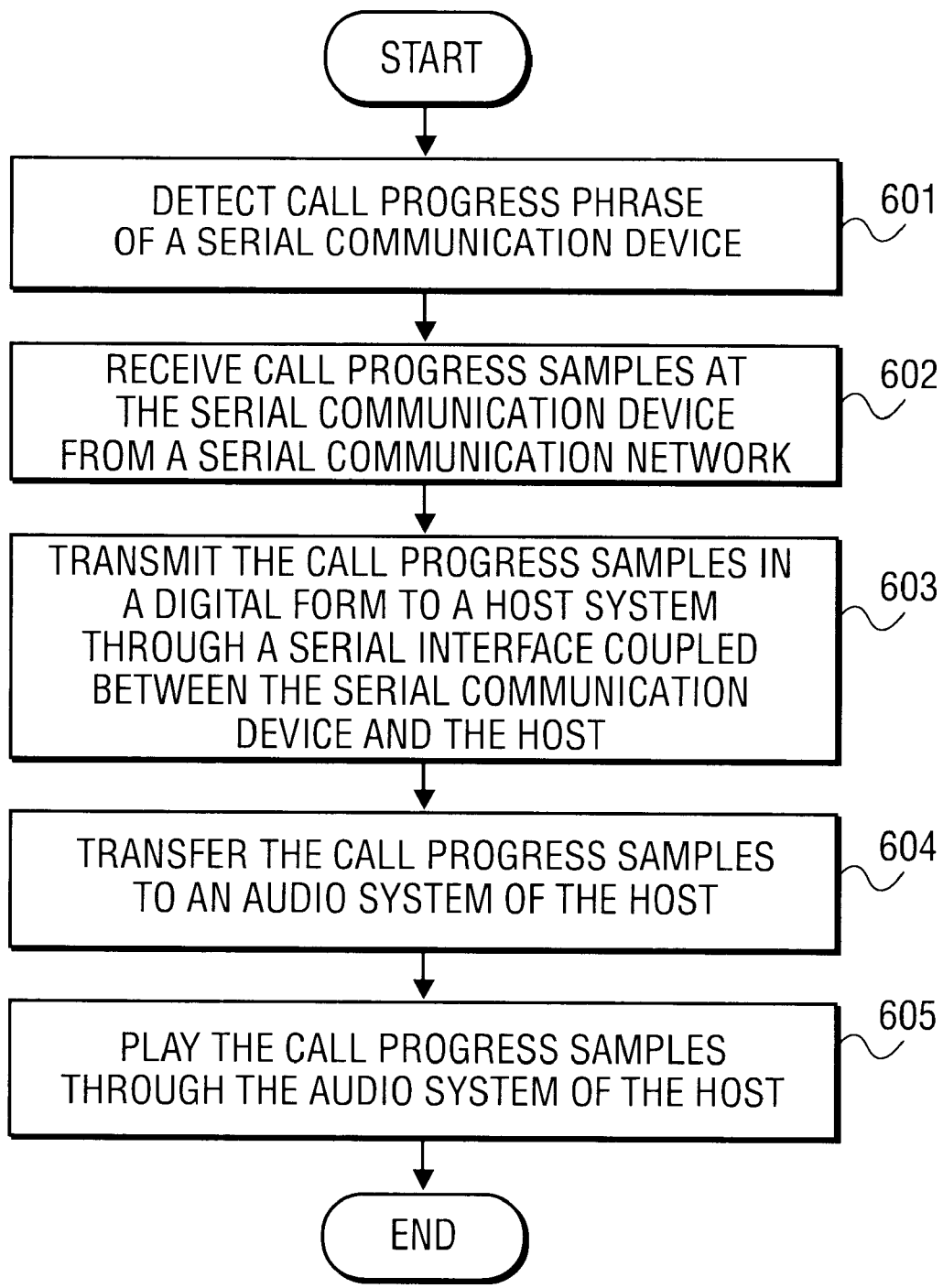
FIG. 6 shows a flowchart of an exemplary method of processing data according to an embodiment of the invention.

FIG. 6 illustrates an exemplary method of processing call progress data of a serial communication device having a serial interface coupling the serial communication device to a host having an audio system, according to one embodiment of the invention. The exemplary method includes receiving data at the serial communication device, from a serial communication network; identifying the data as call progress audio samples; transmitting the call progress audio samples to the host through the serial interface, the serial interface carrying serial modem data or call progress audio samples; and playing the call progress audio samples at the audio system of the host. In an alternative embodiment, an exemplary method includes receiving the data at the host, the data being transmitted from the serial communication device through the serial interface; examining the data at the host, to determine whether the data are call progress audio samples; transmitting the audio samples to the audio system and playing the audio samples at the audio system, if the data are call progress audio samples; and processing the data as regular serial modem data at the host, if the data are not call progress audio samples.

Referring to FIG. 6, at operation block 601, a call progress period is detected at the serial communication device, such as modem 502 of FIG. 5. In one embodiment, the call progress period is detected based on AT commands parsed by the serial device. At operation block 602, when the call progress samples are received at the serial communication device from a serial communication network, the call progress audio samples are captured through an A/D converter. At operation block 603, the call progress audio samples are transmitted from the serial communication device to the host, such as host 501 of FIG. 5, through the serial interface coupling the host and the serial communication device. The serial interface is able to carry either regular serial modem data or call progress audio samples. After the host receives the call progress audio samples, at operation block 604, the call progress audio samples are then transmitted to an audio system of the host and are played (operation block 605) at the speaker of the audio system.

Figure 7A:
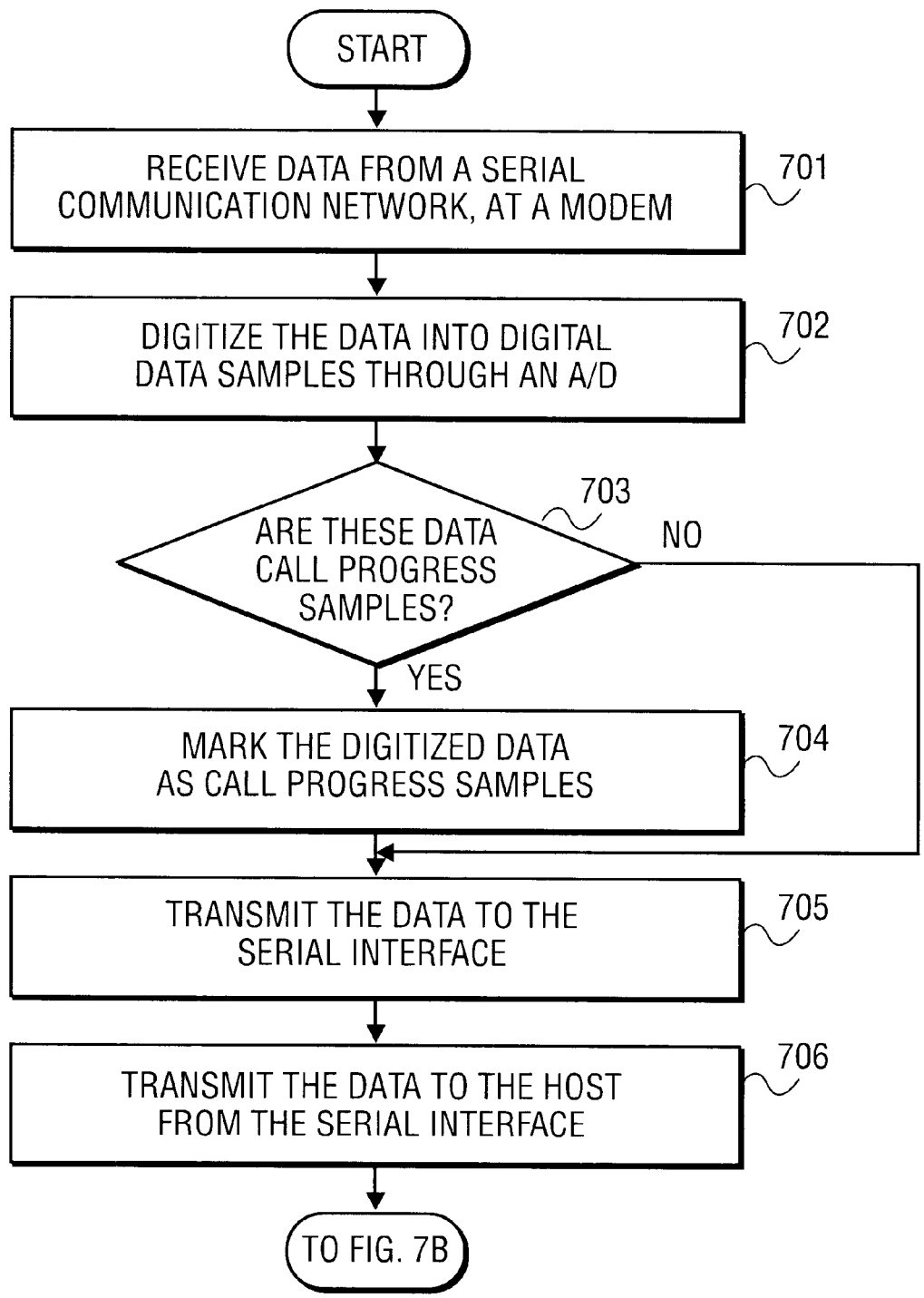
FIGS. 7A and 7B show a flowchart of an alternative exemplary method of processing data according to an embodiment of the invention.
Figure 7B:
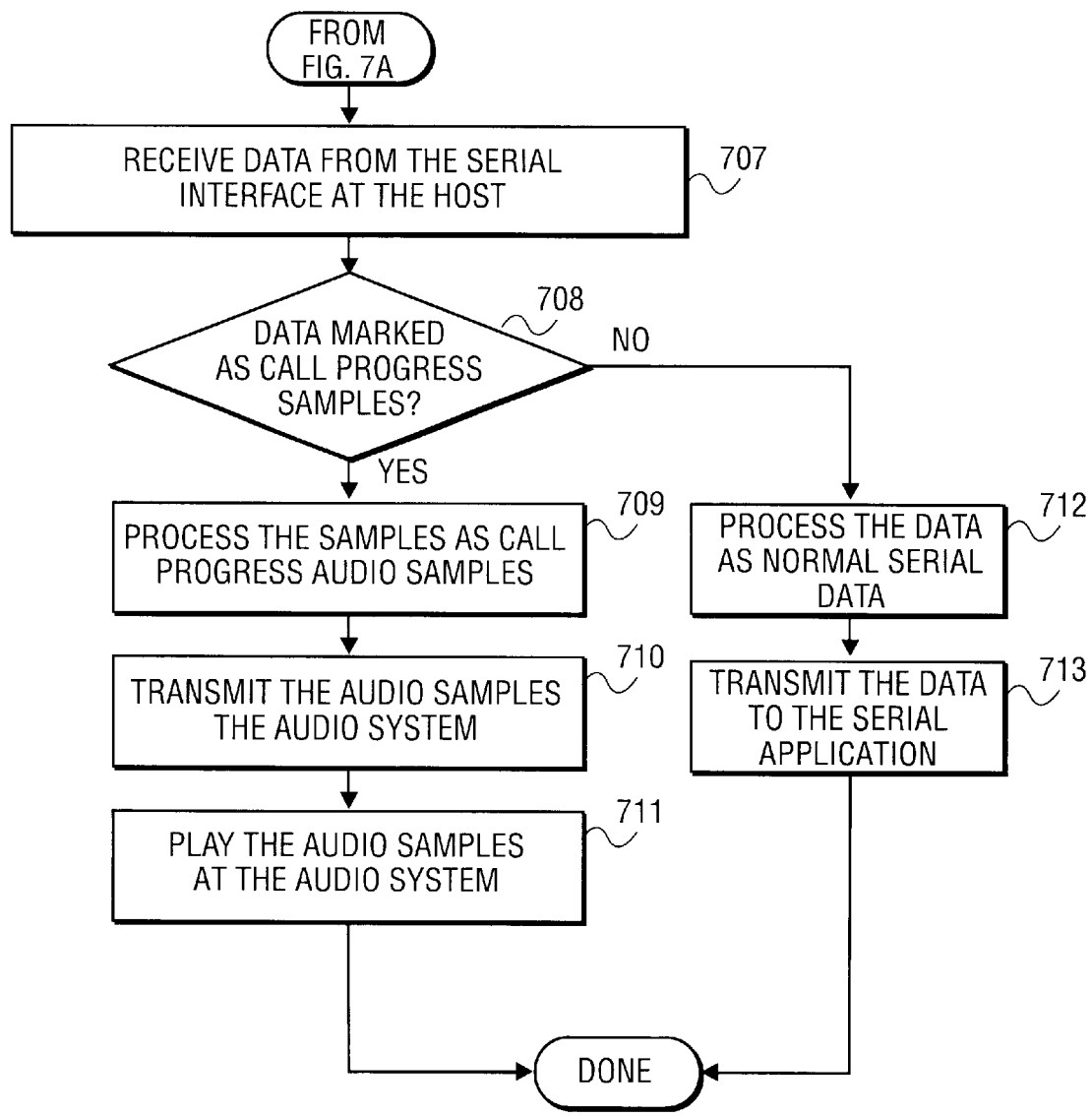

FIGS. 7A and 7B show another exemplary method of processing call progress data of a serial communication device, according to an embodiment of the invention. Referring to FIGS. 7A and 7B, data are received at a modem device (e.g., DAA of the modem) from a serial communication network, at operation block 701. At operation block 702, the data are then digitized through an A/D converter. Next, at block 703, the modem device determines whether these data are call progress audio samples. The determination may be based on whether certain AT commands, such as ATD, ATA, or ATH1 commands, are received prior receiving these data. If the data are call progress audio samples, the data are marked as call progress audio samples. In one embodiment, a header character sequence may be transferred to the host through the serial interface, such as interface 503 of FIG. 5. The header character sequence indicates the starting of the call progress period. In an alternative embodiment, the header character sequence may be embedded in the header of the data packet to be transferred to the host. Thereafter, at block 705, the call progress audio samples are then transmitted to the serial interface. If the data received are not call progress audio samples, the data are directly transferred to serial interface without marking as call progress data. Next, at block 706, the data are transmitted to the host through the serial interface. At block 707, when the data are received at the host, namely a serial driver executed at the host, the host determines, at operation block 708, whether these data are call progress audio samples. In one embodiment, the determination is based on whether the host receives a header character sequence from the modem, prior to receiving the data. In an alternative embodiment, the host may check whether the DCD signal is received. If the DCD is asserted, the data received are normal serial modem data.

If the data are determined as call progress audio samples, at block 709, the data are processed as call progress audio samples, and are transmitted (block 710) to the audio system of the host. Thereafter, the call progress audio samples are played, at block 711, at the audio system. Otherwise, if the data are determined as normal serial modem data, the data are processed as normal serial modem data at operation block 712 and thereafter are transferred (block 713) to a serial application of the host.

Figure 8:
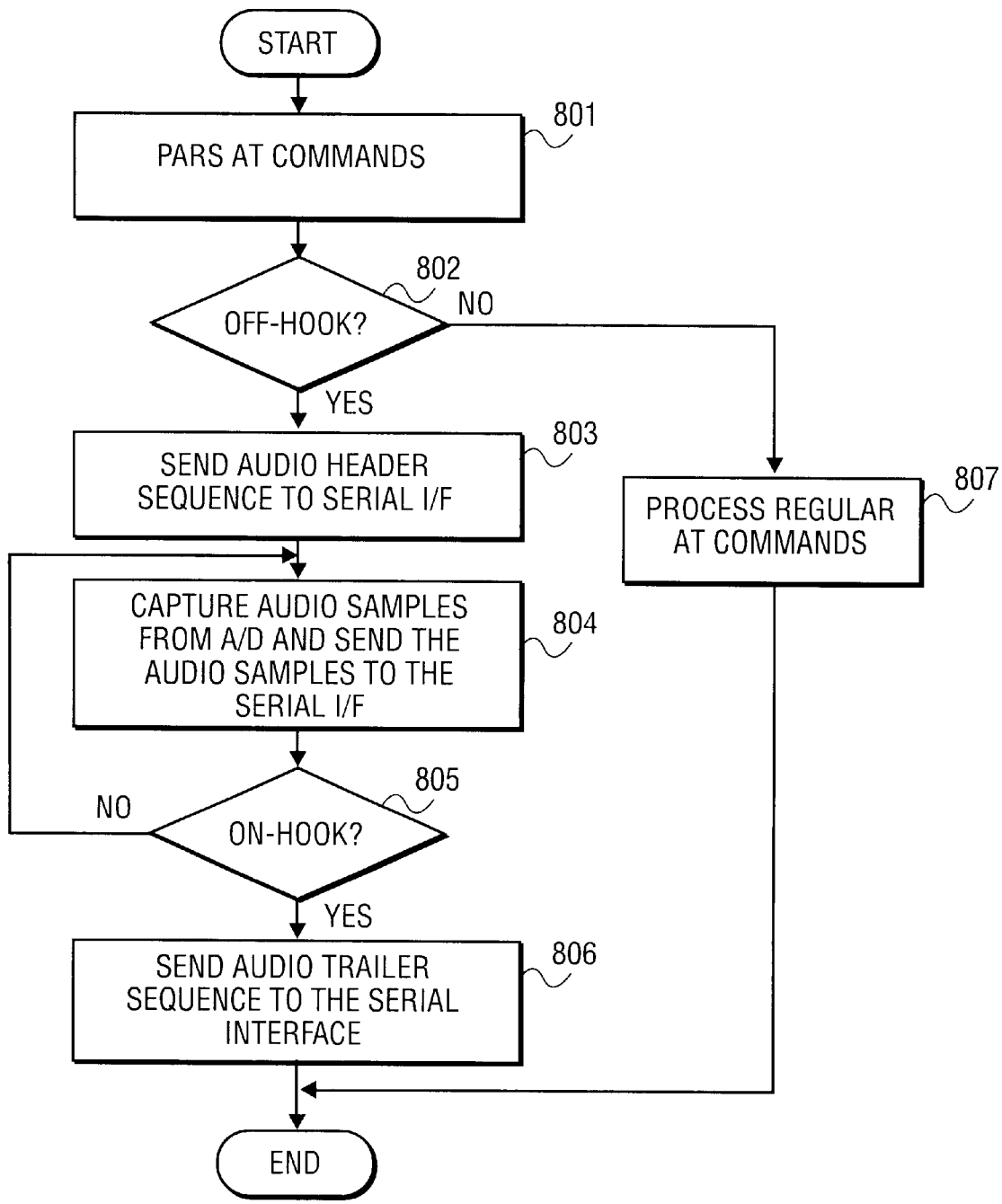
FIG. 8 shows a flowchart of yet another exemplary method of processing data according to an embodiment of the invention.

FIG. 8 shows yet another exemplary method of processing call progress data according to one embodiment of the invention. The exemplary method includes receiving data samples at the serial communication device, from a serial communication network; identifying the data samples as call progress audio samples; transmitting a first character sequence to the host through the serial interface, the first character sequence identifying starting of the call progress; transmitting the call progress audio samples to the host through the serial interface, the serial interface carrying serial data samples or call progress audio samples; and transmitting a second character sequence to the host through the serial interface, the second character sequence indicating ending of the call progress. In an alternative embodiment, the method includes parsing serial communication commands at the serial communication device, the serial communication commands being transmitted from the host, and examining the serial communication commands to determine whether a call progress period has started, or whether a call progress has ended.

Referring to FIG. 8, at operation block 801, the modem receives AT commands from the host, through the serial interface coupling the modem and the host. At block 802, the modem examines the AT commands to determine whether the AT commands include an off-hook command, such as ATA command. If the AT commands do not include an off-hook command, at block 807, the modem processes the commands as regular AT commands and processes the data as regular serial modem data. If the AT commands include an off-hook command, at block 803, the modem sends a header character sequence to the host through the serial interface. The header character sequence indicates that a call progress period has started. The header character sequence normally contains some unusual character sequences. In one embodiment, the header character sequence may contain character sequence of <7E><02>. At block 804, the modem then captures the audio samples from an analog to digital (A/D) converter, converting the analog audio samples received from a DAA and from external phone line, to digital audio samples. The digital audio samples are then transferred to the host through the serial interface. The call progress audio samples are continuously sent to the host through the serial interface, until, at block 805, an on-hook command (e.g., hang-up command ATH0) is received. If an on-hook command is received, at block 806, the modem sends a trailer character sequence to the host through the serial interface. In one embodiment, the trailer character sequence may contain character sequence of <7E><03>.

Figure 9:
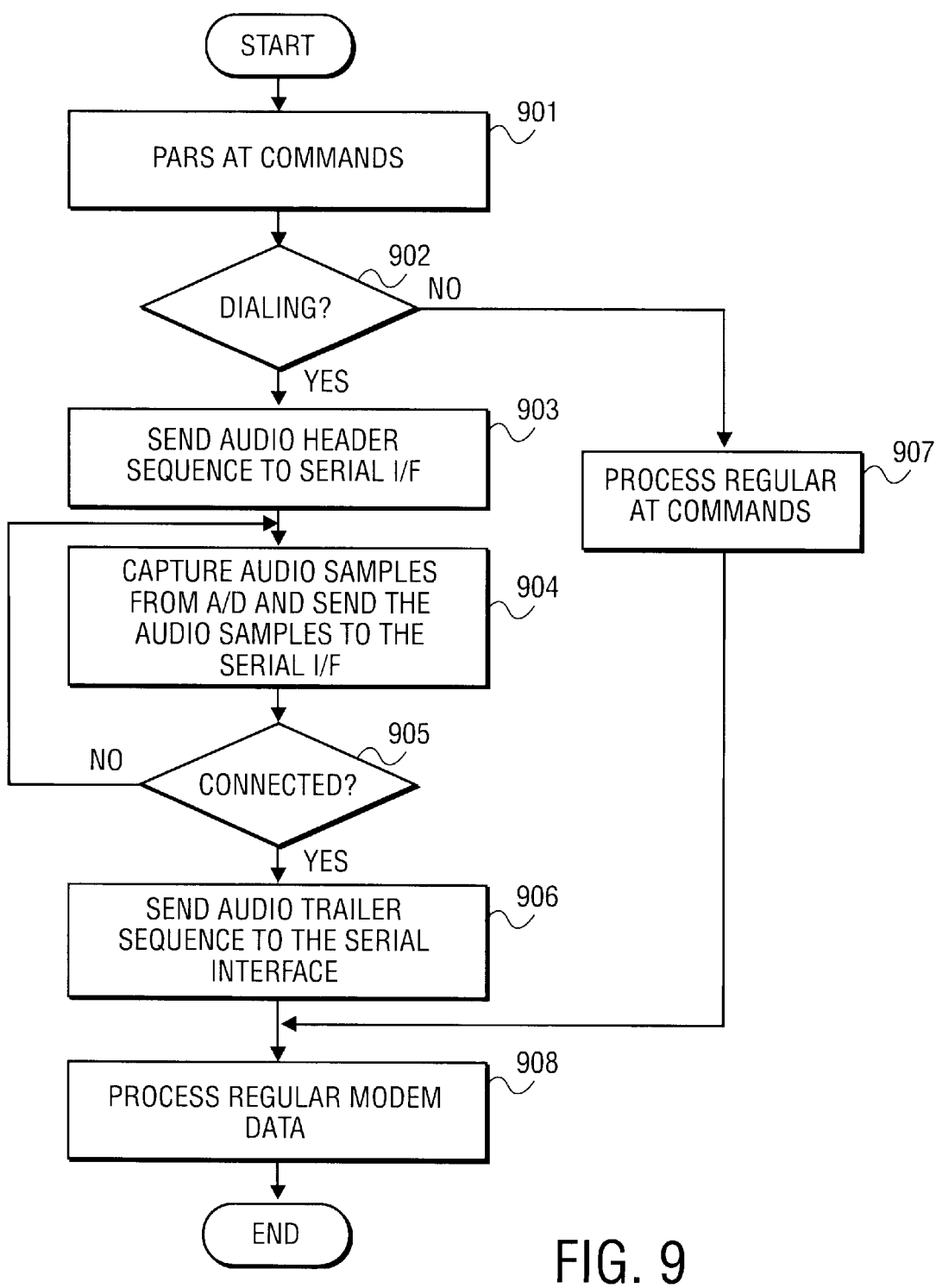
FIG. 9 shows a flowchart of yet another exemplary method of processing data according to an embodiment of the invention.

FIG. 9 shows yet another exemplary method of processing call progress data according to one embodiment of the invention. The exemplary method detects a call progress period by examining, at block 902, AT commands whether the AT commands include a dialing command, such as ATD command. If the AT commands include a dialing command, at block 903, the modem sends a header character sequence to the host through the serial interface, indicating a call progress period has started. Thereafter, the call progress audio samples are captured and are transferred (block 904) to the host through the serial interface. The call progress audio samples are continuously processed, until the connection of the modem and a remote end is established, at block 905. At which point (block 906), the modem sends a trailer character sequence to the host through the serial interface, indicating the end of the call progress period.

Figure 10:
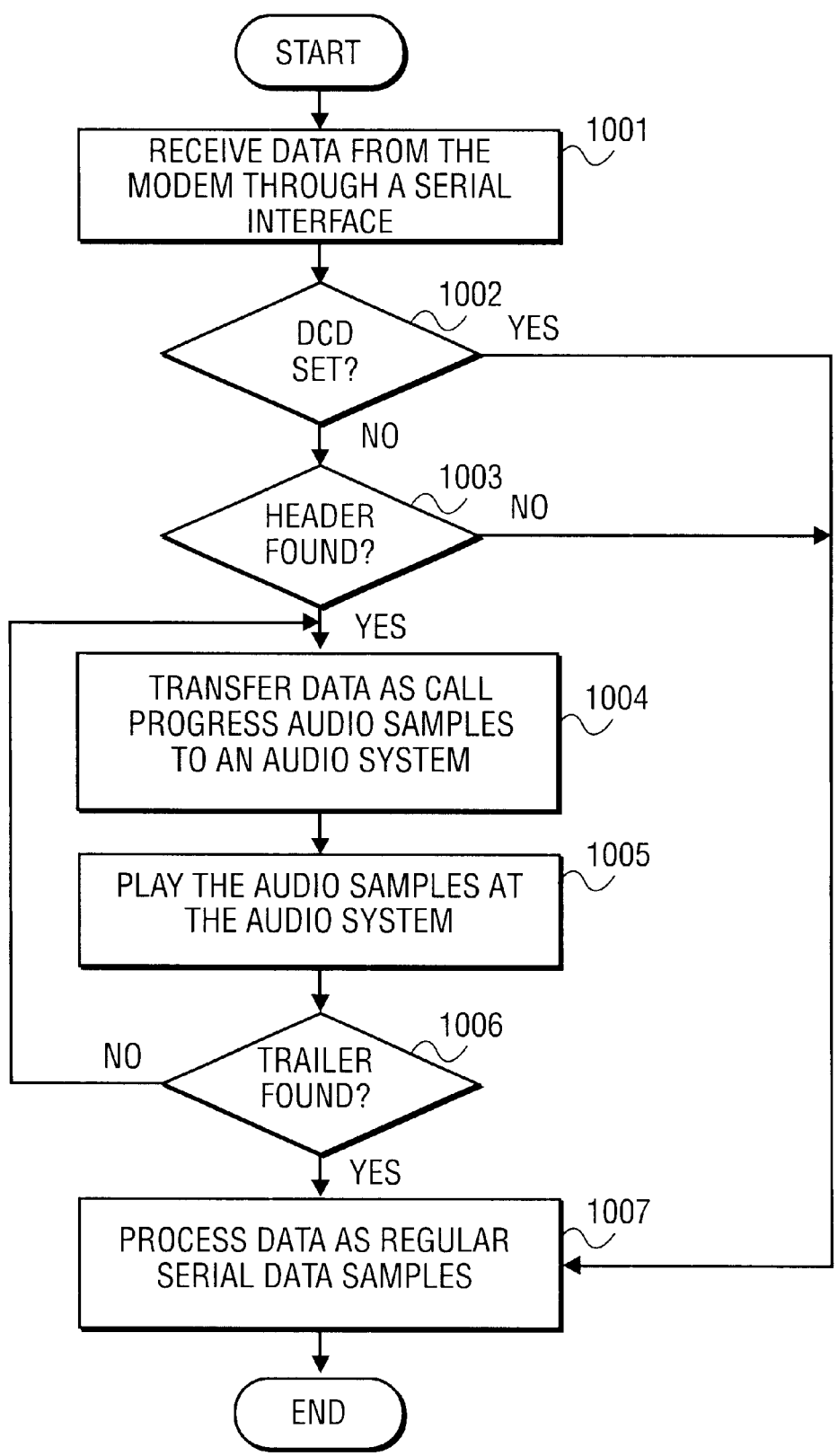
FIG. 10 shows a flowchart of yet another exemplary method of processing data according to an embodiment of the invention.

FIG. 10 shows yet another exemplary method of processing call progress data according to one embodiment of the invention. At block 1001, the host receives data samples from a modem through a serial interface. The host then checks whether the data carrier detect (DCD) line is asserted, at block 1002. If the DCD is set (e.g., the data are regular serial modem data), the host processes the data as regular serial modem data (block 1007). If the DCD is not set, at block 1003, the host checks whether a special header character sequence is received, the header character sequence indicating a call progress period has started. In one embodiment, the header character sequence may include character sequence of <7E><02>. If the header character sequence is received, at block 1004, the data are transferred as call progress audio samples to an audio system at the host. At block 1005, the call progress audio samples are played the audio system. This process continues until a special trailer character sequence is received (block 1006). In one embodiment, the trailer character sequence may include character sequence of <7E><03>. After the trailer character sequence is received, the subsequent data received are processed as regular serial modem data, at block 1007.

Figure 11:
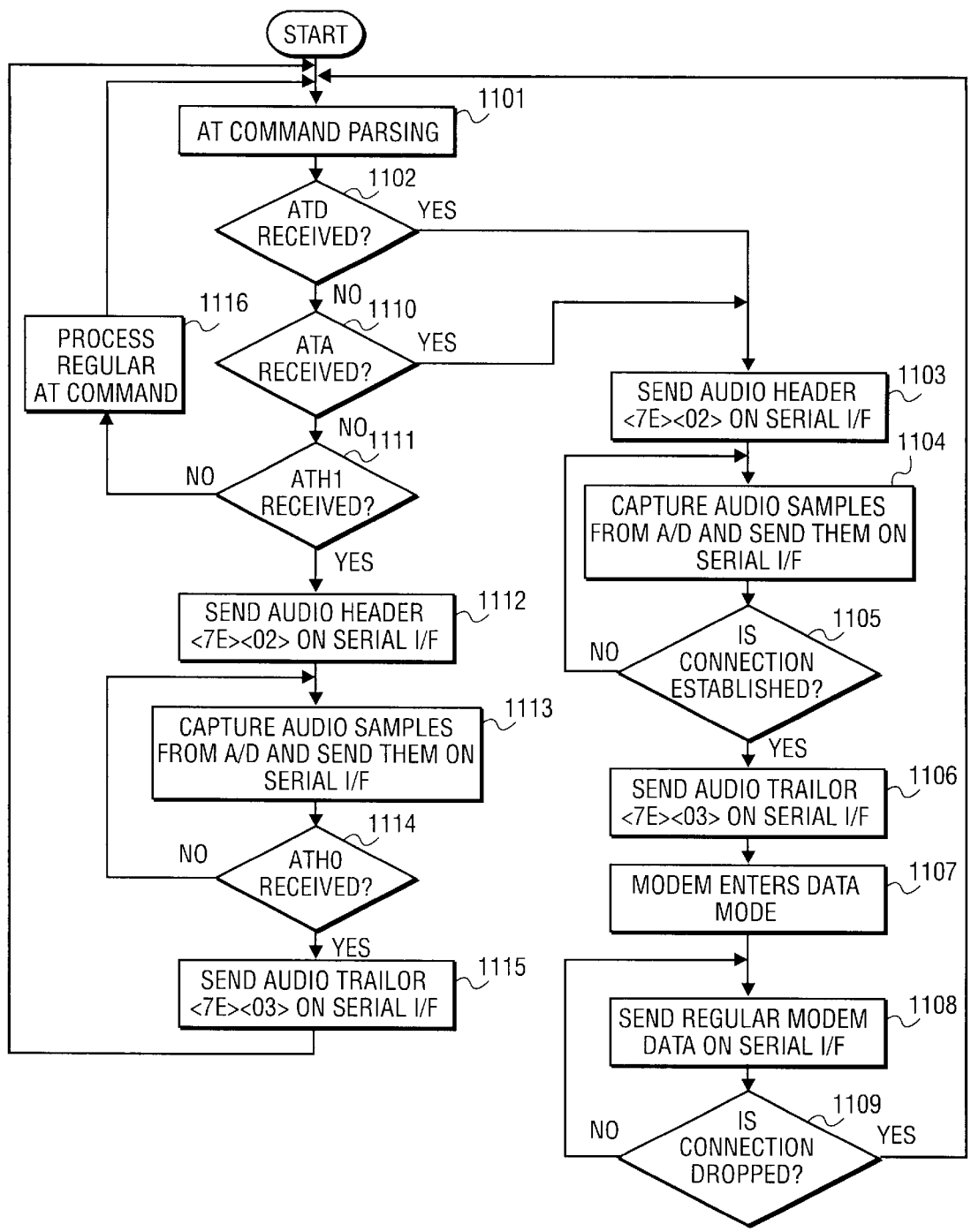
FIG. 11 shows a flowchart of yet another exemplary method of processing data according to an embodiment of the invention.

FIG. 11 shows yet another exemplary method of processing call progress data according to one embodiment of the invention. The exemplary method starts with parsing AT commands received, at block 1101, from the host. The AT commands are then checked (block 1102) whether the commands include a dialing command ATD. If an ATD command is received, the modem sends an audio header character sequence <7E> <02> to the serial interface. The serial interface couples the modem with the host. Next, the modem captures the call progress audio samples from an A/D converter and sends the audio samples to the serial interface (block 1104) and to the host. This process continues until the connection is established (block 1105). After the connection has been established, at block 1106, an audio trailer character sequence <7E><03> is sent to the serial interface and out to the host. Thereafter, the modem enters data mode (block 1107) and subsequent data are sent as regular modem data to the serial interface and out to the host (block 1108). This process continues until the connection is dropped (e.g., hung up), at block 1109.

If the ATD command is not received, the modem checks whether off-hook commands (e.g., ATA or ATH1 command) are received (block 1110 and 1111). If an off-hook command is not received, the modem processes the commands as regular AT commands (block 1116). If an off-hook command is received, at block 1112, the modem sends an audio header character sequence <7E><02> to the serial interface and out to the host. The call progress audio samples are then captured from an A/D converter and are transferred to the serial interface and out to the host. This process continues until an on-hook command, such as ATH0 command, is received (block 1114). When an on-hook command is received, the modem sends an audio trailer character sequence <7E><03> to the host through the serial interface (block 1115).

Figure 12:
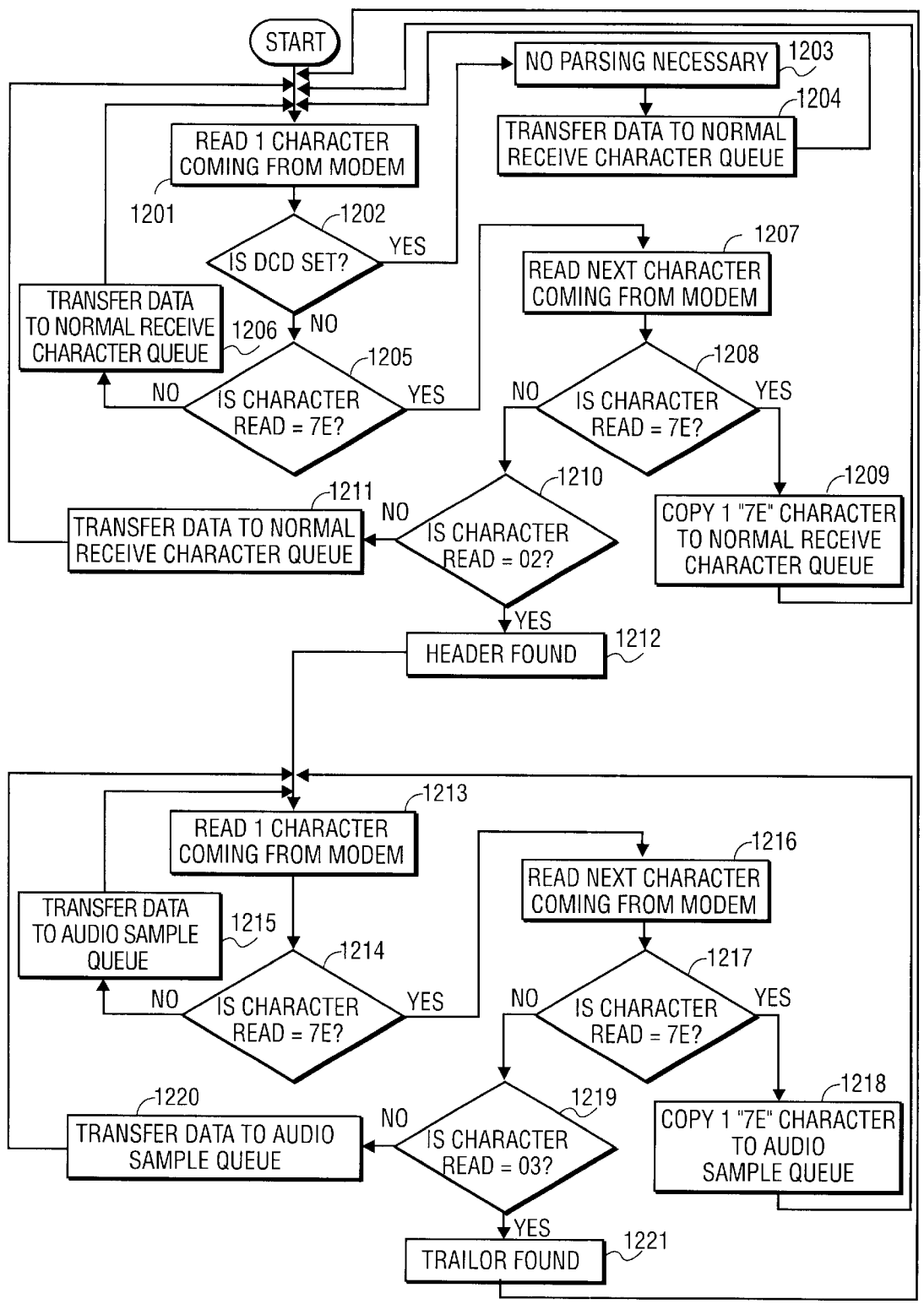
FIG. 12 shows a flowchart of yet another exemplary method of processing data according to an embodiment of the invention.

FIG. 12 shows yet another exemplary method of processing call progress data according to one embodiment of the invention. The exemplary method starts with receiving a character from the modem (block 1201). The host then checks, at block 1202, whether the DCD is set. If the DCD is set, the data received are known to be regular serial modem data and there is no parsing necessary (block 1203). The data are transferred as normal data to the receiving queue (block 1204). If the DCD is not set, the host checks whether the received character is part of header character sequence. In one embodiment, the character is checked whether it is a character of <7E>. If the character is not <7E>, the character is processed as regular modem data and is transferred to a receiving character queue (block 1206). If the character is <7E>, the host then reads a next character from the modem, at block 1207. The next character is then checked whether it is <7E> (block 1208). The character sequence of <7E><7E> indicates that <7E> may be regular serial data, instead of part of the call progress audio header character. If the next character is <7E>, the character is considered as regular serial data and is transferred to receiving queue (block 1209).

If the next character is not <7E>, the host checks next whether the next character is <02>. If the next character is not <02>, in which case, the character sequence is not <7E><02>, the character is processed as regular character, at block 1211. On other hand, if the character is <02>, in which case, the character sequence constitutes an audio header sequence, it is considered an audio header is found (block 1212). Next, the host reads one character from the modem at block 1213. The character read is examined whether the character is <7E> (block 1214). If the character is not <7E>, the character is still considered as an audio sample and at block 1215, the audio sample is placed in the audio sample queue. If the character is <7E>, which may indicates a possible trailer character sequence. The host then reads a next character from the modem (block 1216). The next character is then checked whether the character is <7E> at block 1217. If the next character is <7E>, as discussed above, a double character sequence of <7E> <7E> indicates the sample is data, instead of header or trailer. As a result, the sample is considered as an audio sample and is placed in the audio sample queue (block 1218). If the next character is not <7E>, the next character is checked whether it is <03>. If the next character is <03>, it is considered a trailer is found and the call progress period is ended (block 1221). Otherwise, the character is considered as another audio sample and is placed in the audio sample queue (block 1220).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing call progress data of a serial communication device having a serial interface coupling the serial communication device to a host having an audio system, the method comprising:

receiving data at the serial communication device, from a serial communication network;

identifying the data as call progress audio samples;

transmitting the call progress audio samples to the host through the serial interface, the serial interface carrying serial data or call progress audio samples; and playing the call progress audio samples at the audio system of the host.

2. The method of claim 1, further comprising:
parsing serial communication commands at the serial communication device, the serial communication commands being transmitted from the host; and
examining the serial communication commands to determine whether a call progress period has started, or whether a call progress has ended.

3. The method of claim 2, further comprising marking the data as call progress audio samples if the call progress period has started.

4. The method of claim 2, wherein if the call progress has started, the method further comprises transmitting a first character sequence to the host through the serial interface, before transmitting the call progress audio samples, the first character sequence indicating starting of the call progress period.

5. The method of claim 2, further comprising marking the data as normal serial data if the call progress period has ended.

6. The method of claim 2, wherein if the call progress period has ended, the method further comprises transmitting a second character sequence to the host through the serial interface, after transmitting the call progress audio samples and before transmitting subsequent normal serial data, the second character sequence indicating ending of the call progress period.

7. The method of claim 2, wherein the serial communication commands indicating call progress period comprises an ATH1, an ATD, and an ATA commands.

8. The method of claim 1, further comprising:
receiving the data at the host, the data being transmitted from the serial communication device through the serial interface;
examining the data at the host, to determine whether the data are call progress audio samples;
transmitting the audio samples to the audio system and playing the audio samples at the audio system, if the data are call progress audio samples; and
processing the data as regular serial data at the host, if the data are not call progress audio samples.

9. The method of claim 8, wherein the determination of whether the data are call progress audio samples comprises determining whether a first character sequence or a second character sequence are received, the first character sequence indicating starting of the call progress period and the second character sequence indicating ending of the call progress period.

10. The method of claim 9, further comprising:
processing the data as call progress audio samples if the first character sequence is received; and
processing the data as regular serial data if the second character sequence is received.

11. The method of claim 8, wherein the determination of whether the data are call progress audio samples comprises determining whether a data carrier detect signal (DCD) is asserted, the asserted DCD indicating that data are not call progress audio samples.

12. The method of claim 4, wherein the first character sequence comprises a character sequence of "<7E><02>".

13. The method of claim 6, wherein the second character sequence comprises a character sequence of "<7E><03>".

14. A method for processing data of a serial communication device having a serial interface coupling the serial communication device to a host, the method comprising:
receiving data at the serial communication device, from a serial communication network;
identifying the data as call progress audio samples;
transmitting a first character sequence to the host through the serial interface, the first character sequence identifying starting of the call progress;
transmitting the call progress audio samples to the host through the serial interface, the serial interface carrying serial data or call progress audio samples; and
transmitting a second character sequence to the host through the serial interface, the second character sequence indicating ending of the call progress.

15. The method of claim 14, further comprising:
parsing serial communication commands at the serial communication device, the serial communication commands being transmitted from the host; and
examining the serial communication commands to determine whether a call progress period has started, or whether a call progress has ended.

16. The method of claim 15, further comprising:
examining the serial communication commands to determine whether the serial communication commands include an ATD, an ATA, and an ATH1 commands;
processing the data samples as call progress audio samples if the serial communication commands include an ATD, an ATA, and an ATH1 commands.

17. The method of claim 15, further comprising:
examining the serial communication commands to determine whether the serial communication commands include an ATH0 or ATH command;
processing the data as serial data if the serial communication commands include an ATH0 or ATH command.

18. The method of claim 14, further comprising capturing the call progress audio samples from an analog to digital (A/D) converter.

19. The method of claim 15, wherein the serial communication commands indicating call progress period comprises an ATH1, an ATD, and an ATA commands.

20. The method of claim 14, wherein the first character sequence comprises a character sequence of "<7E><02>", and wherein the second character sequence comprises a character sequence of "<7E><03>".

21. A method for processing data of a serial communication device having a serial interface coupling the serial communication device to a host having an audio system, the method comprising:
receiving the data at the host, the data being transmitted from the serial communication device through the serial interface, the serial interface carrying serial data or call progress audio samples;
examining the data at the host, to determine whether the data are call progress audio samples;
transmitting the audio samples to the audio system and playing the audio samples at the audio system, if the data are call progress audio samples; and
processing the data as regular serial data at the host, if the data are not call progress audio samples.

22. The method of claim 21, wherein the determination of whether the data are call progress audio samples comprises determining whether a first character sequence or a second character sequence are received, the first character sequence indicating starting of the call progress period and the second character sequence indicating ending of the call progress period.

23. The method of claim 21, wherein the determination of whether the data are call progress audio samples comprises determining whether a data carrier detect signal (DCD) is asserted, the asserted DCD indicating that data are not call progress audio samples.

24. The method of claim 22, wherein the first character sequence comprises a character sequence of "<7E><02>", and wherein the second character sequence comprises a character sequence of "<7E><03>".

25. An apparatus having a serial interface coupling the apparatus to a host having an audio system, the apparatus comprising:
  a data access arrangement (DAA) for receiving call progress audio samples and modem serial data from a serial communication network;
  an analog to digital (A/D) converter for capturing the call progress audio signal into digital audio samples; and
  a modem software module for transmitting the digital audio samples to the host through the serial interface, the serial interface carrying serial data or call progress audio samples, and the digital audio samples being played at the audio system of the host.

26. The apparatus of claim 25, further comprising a software multiplex module for multiplexing the digital audio samples with normal serial data to be transmitted to the host through the serial interface.

27. A system, comprising:
  a serial communication device, the serial communication device having a modem software module;
  a host, the host having serial driver and a software de-multiplex module;
  a serial interface coupling the serial communication device with the host, the serial interface carrying serial data or call progress audio samples;
  wherein the modem software module of the serial communication device receives the call progress audio samples from a serial communication network and transmits the call progress audio samples to the host through the serial interface;
  wherein the software de-multiplex module of the host receives the call progress audio samples from the serial communication device through the serial interface and transmits the call progress audio samples to an audio system of the host; and
  wherein the call progress audio samples are played at the audio system of the host.

28. The system of claim 27, further comprising a software multiplex module coupled to the modem software module of the serial communication device, the software multiplex module multiplexing the call progress audio samples with normal serial data to be transmitted to the host through the serial interface.

29. An apparatus for processing call progress data of a serial communication device having a serial interface coupling the serial communication device to a host having an audio system, the apparatus comprising:
  means for receiving data at the serial communication device, from a serial communication network;
  means for identifying the data as call progress audio samples;
  means for transmitting the call progress audio samples to the host through the serial interface, the serial interface carrying serial data or call progress audio samples; and
  means for playing the call progress audio samples at the audio system of the host.

30. The apparatus of claim 29, further comprising:
  means for parsing serial communication commands at the serial communication device, the serial communication commands being transmitted from the host; and
  means for examining the serial communication commands to determine whether a call progress period has started, or whether a call progress has ended.

31. The apparatus of claim 30, further comprising means for marking the data as call progress audio samples if the call progress period has started.

32. The apparatus of claim 30, wherein if the call progress has started, the apparatus further comprises means for transmitting a first character sequence to the host through the serial interface, before transmitting the call progress audio samples, the first character sequence indicating starting of the call progress period.

33. The apparatus of claim 30, further comprising means for marking the data as normal serial data if the call progress period has ended.

34. The apparatus of claim 30, wherein if the call progress period has ended, the apparatus further comprises means for transmitting a second character sequence to the host through the serial interface, after transmitting the call progress audio samples and before transmitting subsequent normal serial data, the second character sequence indicating ending of the call progress period.

35. The apparatus of claim 30, wherein the serial communication commands indicating call progress period comprises an ATH1, an ATD, and an ATA commands.

36. The apparatus of claim 29, further comprising:
  means for receiving the data at the host, the data being transmitted from the serial communication device through the serial interface;
  means for examining the data at the host, to determine whether the data are call progress audio samples;
  means for transmitting the audio samples to the audio system and playing the audio samples at the audio system, if the data are call progress audio samples; and
  means for processing the data as regular serial data at the host, if the data are not call progress audio samples.

37. The apparatus of claim 36, wherein the determination of whether the data are call progress audio samples comprises determining whether a first character sequence or a second character sequence are received, the first character sequence indicating starting of the call progress period and the second character sequence indicating ending of the call progress period.

38. The apparatus of claim 37, further comprising:
  means for processing the data as call progress audio samples if the first character sequence is received; and
  means for processing the data as regular serial data if the second character sequence is received.

39. The apparatus of claim 36, wherein the determination of whether the data are call progress audio samples comprises determining whether a data carrier detect signal (DCD) is asserted, the asserted DCD indicating that data are not call progress audio samples.

40. The apparatus of claim 32, wherein the first character sequence comprises a character sequence of "<7E><02>".

41. The apparatus of claim 34, wherein the second character sequence comprises a character sequence of "<7E><03>".

42. An apparatus for processing data of a serial communication device having a serial interface coupling the serial communication device to a host, the apparatus comprising:
  means for receiving data at the serial communication device, from a serial communication network;
  means for identifying the data as call progress audio samples;
  means for transmitting a first character sequence to the host through the serial interface, the first character sequence identifying starting of the call progress;
  means for transmitting the call progress audio samples to the host through the serial interface, the serial interface carrying serial data or call progress audio samples; and
  means for transmitting a second character sequence to the host through the serial interface, the second character sequence indicating ending of the call progress.

43. The apparatus of claim 42, further comprising:

means for parsing serial communication commands at the serial communication device, the serial communication commands being transmitted from the host; and means for examining the serial communication commands to determine whether a call progress period has started, or whether a call progress has ended.

44. The apparatus of claim 43, further comprising:

means for examining the serial communication commands to determine whether the serial communication commands include an ATD, an ATA, and an ATH1 commands;

means for processing the data samples as call progress audio samples if the serial communication commands include an ATD, an ATA, and an ATH1 commands.

45. The apparatus of claim 43, further comprising:

means for examining the serial communication commands to determine whether the serial communication commands include an ATH0 or ATH command;

means for processing the data as serial data if the serial communication commands include an ATH0 or ATH command.

46. The apparatus of claim 42, further comprising means for capturing the call progress audio samples from an analog to digital (A/D) converter.

47. The apparatus of claim 43, wherein the serial communication commands indicating call progress period comprises an ATH1, an ATD, and an ATA commands.

48. The apparatus of claim 42, wherein the first character sequence comprises a character sequence of "<7E><02>", and wherein the second character sequence comprises a character sequence of "<7E><03>".

49. An apparatus for processing data of a serial communication device having a serial interface coupling the serial communication device to a host having an audio system, the apparatus comprising:

means for receiving the data at the host, the data being transmitted from the serial communication device through the serial interface, the serial interface carrying serial data or call progress audio samples;

means for examining the data at the host, to determine whether the data are call progress audio samples;

means for transmitting the audio samples to the audio system and playing the audio samples at the audio system, if the data are call progress audio samples; and means for processing the data as regular serial data at the host, if the data are not call progress audio samples.

50. The apparatus of claim 49, wherein the determination of whether the data are call progress audio samples comprises determining whether a first character sequence or a second character sequence are received, the first character sequence indicating starting of the call progress period and the second character sequence indicating ending of the call progress period.

51. The apparatus of claim 49, wherein the determination of whether the data are call progress audio samples comprises determining whether a data carrier detect signal (DCD) is asserted, the asserted DCD indicating that data are not call progress audio samples.

52. The apparatus of claim 50, wherein the first character sequence comprises a character sequence of "<7E><02>", and wherein the second character sequence comprises a character sequence of "<7E><03>".

53. A machine-readable medium having stored thereon executable code which causes a machine to perform a method, for processing call progress data of a serial communication device having a serial interface coupling the serial communication device to a host having an audio system, the method comprising:

receiving data at the serial communication device, from a serial communication network;

identifying the data as call progress audio samples;

transmitting the call progress audio samples to the host through the serial interface, the serial interface carrying serial data or call progress audio samples; and playing the call progress audio samples at the audio system of the host.

54. The machine-readable medium of claim 53, wherein the method further comprises:

parsing serial communication commands at the serial communication device, the serial communication commands being transmitted from the host; and examining the serial communication commands to determine whether a call progress period has started, or whether a call progress has ended.

55. The machine-readable medium of claim 53, wherein the method further comprises marking the data as call progress audio samples if the call progress period has started.

56. The machine-readable medium of claim 54, wherein if the call progress has started, the method further comprises transmitting a first character sequence to the host through the serial interface, before transmitting the call progress audio samples, the first character sequence indicating starting of the call progress period.

57. The machine-readable medium of claim 54, wherein the method further comprises marking the data as normal serial data if the call progress period has ended.

58. The machine-readable medium of claim 54, wherein if the call progress period has ended, the method further comprises transmitting a second character sequence to the host through the serial interface, after transmitting the call progress audio samples and before transmitting subsequent normal serial data, the second character sequence indicating ending of the call progress period.

59. The machine-readable medium of claim 54, wherein the serial communication commands indicating call progress period comprises an ATH1, an ATD, and an ATA commands.

60. The machine-readable medium of claim 53, wherein the method further comprises:

receiving the data at the host, the data being transmitted from the serial communication device through the serial interface;

examining the data at the host, to determine whether the data are call progress audio samples;

transmitting the audio samples to the audio system and playing the audio samples at the audio system, if the data are call progress audio samples; and processing the data as regular serial data at the host, if the data are not call progress audio samples.

61. The machine-readable medium of claim 60, wherein the determination of whether the data are call progress audio samples comprises determining whether a first character sequence or a second character sequence are received, the first character sequence indicating starting of the call progress period and the second character sequence indicating ending of the call progress period.

62. The machine-readable medium of claim 61, wherein the method further comprises:

processing the data as call progress audio samples if the first character sequence is received; and processing the data as regular serial data if the second character sequence is received.

63. The machine-readable medium of claim 60, wherein the determination of whether the data are call progress audio samples comprises determining whether a data carrier detect signal (DCD) is asserted, the asserted DCD indicating that data are not call progress audio samples.

64. The machine-readable medium of claim 56, wherein the first character sequence comprises a character sequence of "<7E><02>".

65. The machine-readable medium of claim 58, wherein the second character sequence comprises a character sequence of "<7E><03>".

66. A machine-readable medium having stored thereon executable code which causes a machine to perform a method, for processing data of a serial communication device having a serial interface coupling the serial communication device to a host, the method comprising:

receiving data at the serial communication device, from a serial communication network;

identifying the data as call progress audio samples;

transmitting a first character sequence to the host through the serial interface, the first character sequence identifying starting of the call progress;

transmitting the call progress audio samples to the host through the serial interface, the serial interface carrying serial data or call progress audio samples; and transmitting a second character sequence to the host through the serial interface, the second character sequence indicating ending of the call progress.

67. The machine-readable medium of claim 66, wherein the method further comprises:

parsing serial communication commands at the serial communication device, the serial communication commands being transmitted from the host; and examining the serial communication commands to determine whether a call progress period has started, or whether a call progress has ended.

68. The machine-readable medium of claim 67, wherein the method further comprises:

examining the serial communication commands to determine whether the serial communication commands include an ATD, an ATA, and an ATH1 commands;

processing the data as call progress audio samples if the serial communication commands include an ATD, an ATA, and an ATH1 commands.

69. The machine-readable medium of claim 67, wherein the method further comprises:

examining the serial communication commands to determine whether the serial communication commands include an-ATH0 or ATH command;

processing the data as serial data if the serial communication commands include an ATH0 or ATH command.

70. The machine-readable medium of claim 66, wherein the method further comprises capturing the call progress audio samples from an analog to digital (A/D) converter.

71. The machine-readable medium of claim 67, wherein the serial communication commands indicating call progress period comprises an ATH1, an ATD, and an ATA commands.

72. The machine-readable medium of claim 66, wherein the first character sequence comprises a character sequence of "<7E><02>", and wherein the second character sequence comprises a character sequence of "<7E><03>".

73. A machine-readable medium having stored thereon executable code which causes a machine to perform a method, for processing data of a serial communication device having a serial interface coupling the serial communication device to a host having an audio system, the method comprising:

receiving the data at the host, the data being transmitted from the serial communication device through the serial interface, the serial interface carrying serial data or call progress audio samples;

examining the data at the host, to determine whether the data are call progress audio samples;

transmitting the audio samples to the audio system and playing the audio samples at the audio system, if the data are call progress audio samples; and processing the data as regular serial data at the host, if the data are not call progress audio samples.

74. The machine-readable medium of claim 73, wherein the determination of whether the data are call progress audio samples comprises determining whether a first character sequence or a second character sequence are received, the first character sequence indicating starting of the call progress period and the second character sequence indicating ending of the call progress period.

75. The machine-readable medium of claim 73, wherein the determination of whether the data are call progress audio samples comprises determining whether a data carrier detect signal (DCD) is asserted, the asserted DCD indicating that data are not call progress audio samples.

76. The machine-readable medium of claim 74, wherein the first character sequence comprises a character sequence of "<7E><02>", and wherein the second character sequence comprises a character sequence of "<7E><03>".

* * * * *